US012347934B2

(12) United States Patent
Bae

(10) Patent No.: US 12,347,934 B2
(45) Date of Patent: Jul. 1, 2025

(54) INTEGRATED MODULAR ANTENNA SYSTEM

(71) Applicant: Motional AD LLC, Boston, MA (US)

(72) Inventor: Jungnam Bae, Massachusetts, MA (US)

(73) Assignee: Motional AD LLC, Boston, MA (US)

( * ) Notice: Subject to any disclaimer, the term of this patent is extended or adjusted under 35 U.S.C. 154(b) by 32 days.

(21) Appl. No.: 17/902,930

(22) Filed: Sep. 5, 2022

(65) Prior Publication Data

US 2024/0079795 A1 Mar. 7, 2024

(51) Int. Cl.
*H01Q 21/28* (2006.01)
*H01Q 1/32* (2006.01)

(52) U.S. Cl.
CPC ........... *H01Q 21/28* (2013.01); *H01Q 1/3208* (2013.01)

(58) Field of Classification Search
CPC ...... H01Q 21/28; H01Q 1/3208; H01Q 1/325; H01Q 1/3275; H01Q 1/521
See application file for complete search history.

(56) References Cited

U.S. PATENT DOCUMENTS

2019/0267702 A1 8/2019 Shiroki et al.
2020/0058988 A1* 2/2020 Elshaar ................ H01Q 1/3275
2021/0083371 A1 3/2021 Koide
2021/0399439 A1 12/2021 Kubo

FOREIGN PATENT DOCUMENTS

CN 210668677 U * 6/2020

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
Mehr, G et al., "X-CAR: An Experimental Vehicle Platform for Connected Autonomy Research Powered by CARMA℠", Cornell University, Apr. 2022, in 13 pages. URL: https://arxiv.org/abs/2204.02559v1.
International Search Report and Written Opinion received for PCT Application No. PCT/US2023/073157, mailed Dec. 7, 2023.

* cited by examiner

*Primary Examiner* — Dieu Hien T Duong
(74) *Attorney, Agent, or Firm* — Knobbe, Martens, Olson & Bear, LLP

(57) ABSTRACT

Provided are systems, vehicles, and/or autonomous vehicles, which can include integrated modular antenna systems. Some systems include a plurality of antenna assemblies having a first antenna and a second antenna. In some systems, the first antenna is a different antenna type than the second antenna, and the first antenna and second antenna are spaced apart.

14 Claims, 11 Drawing Sheets

500

500

INTEGRATED MODULAR ANTENNA SYSTEM

BACKGROUND

Autonomous vehicles (AVs) typically include many systems that communicate using antennas with systems external to the AV. There are various makes and models of AVs, and each vehicle requires a specific antenna structure. However, designing antennas specifically for each vehicle takes significant time and cost, and is very inefficient. One approach to enable AVs to transmit and receive data in a practical and applicable manner has been to place the majority of antennas on the roof of the AV. However, this approach can be difficult to implement with small vehicles due to the large number of antennas required to be on the limited roof area.

DETAILED DESCRIPTION

Figure 1:
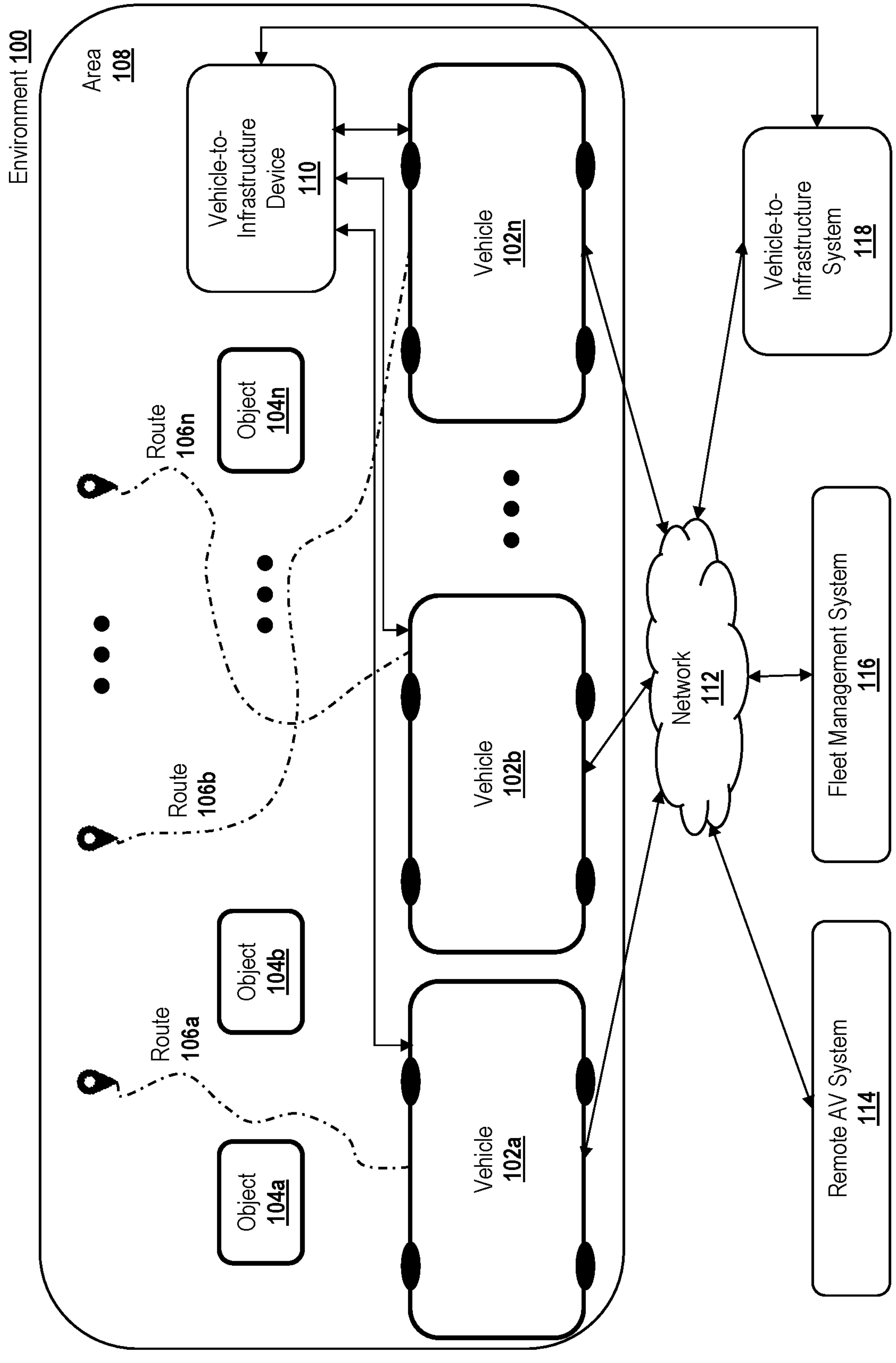
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term “if” is, optionally, construed to mean “when”, “upon”, “in response to determining,” “in response to detecting,” and/or the like, depending on the context. Similarly, the phrase “if it is determined” or “if [a stated condition or event] is detected” is, optionally, construed to mean “upon determining,” “in response to determining,” “upon detecting [the stated condition or event],” “in response to detecting [the stated condition or event],” and/or the like, depending on the context. Also, as used herein, the terms “has”, “have”, “having”, or the like are intended to be open-ended terms. Further, the phrase “based on” is intended to mean “based at least partially on” unless explicitly stated otherwise.

“At least one,” and “one or more” includes a function being performed by one element, a function being performed by more than one element, e.g., in a distributed fashion, several functions being performed by one element, several functions being performed by several elements, or any combination of the above.”

Some embodiments of the present disclosure are described herein in connection with a threshold. As described herein, satisfying, such as meeting, a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, the disclosure described herein includes and/or implements an integrated modular (e.g., distributed) antenna system, such as for use in autonomous vehicles. In particular, the present disclosure uses a distributed or modular antenna system which can be modifiable for optimization, such as for different vehicle configurations. The modular antenna system can include different combinations of cellular communication, V2X, and geolocation antennas, e.g. depending on the target application. The different antennas can be distributed around the vehicle, and may not be limited to a particular location on the vehicle, such as the roof. The placement of the various antennas for respective communication systems is advantageous for isolation between antennas and for radiation performance.

By virtue of the implementation of disclosure described herein, implementations of integrated modular antenna systems enable improvement and optimization of antenna performance for antennas of an autonomous vehicle. An autonomous vehicle experiences various conditions for wireless communication, and different autonomous vehicles have different vehicle conditions (e.g., dimensions and/or structure, interference due to antenna positioning) and thus require specific antenna structures. Through the use of a plurality of antenna assemblies, the configuration of the modular antenna system (such as the location of the antenna assemblies of the plurality of antenna assemblies) can be flexible for the propagation conditions and/or type of vehicle. In some examples, this would ease implementation and manufacturing concerns. Advantageously, the disclosed modular antenna system can tune the performance of the antennas (e.g., based on the environmental conditions and/or physical obstacles). The disclosed modular antenna system also enables greater separation between antennas and therefore improved isolation. Moreover, the location on a vehicle of the antennas (such as the antenna assemblies) of the modular antenna system can be adjusted to optimize the radiation of the antennas. The antenna system is advantageously upgradable to support next generation network needs. Moreover, the disclosed modular antenna system is capable of interoperating with another assembly, such as via cables, and can be extended to smart antennas with a modem (e.g., network access device).

Referring now to FIG. 1, illustrated is example environment 100 in which vehicles that include autonomous systems, as well as vehicles that do not, are operated. As illustrated, environment 100 includes vehicles 102*a*-102*n*, objects 104*a*-104*n*, routes 106*a*-106*n*, area 108, vehicle-to-infrastructure (V2I) device 110, network 112, remote autonomous vehicle (AV) system 114, fleet management system 116, and V2I system 118. Vehicles 102*a*-102*n*, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104*a*-104*n* interconnect with at least one of vehicles 102*a*-102*n*, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102*a*-102*n* (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106*a*-106*n* (referred to individually as route 106 and collectively as routes 106), as described herein. In some embodiments, one or more vehicles 102 include an autonomous system (e.g., an autonomous system that is the same as or similar to autonomous system 202).

Objects 104*a*-104*n* (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106*a*-106*n* (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
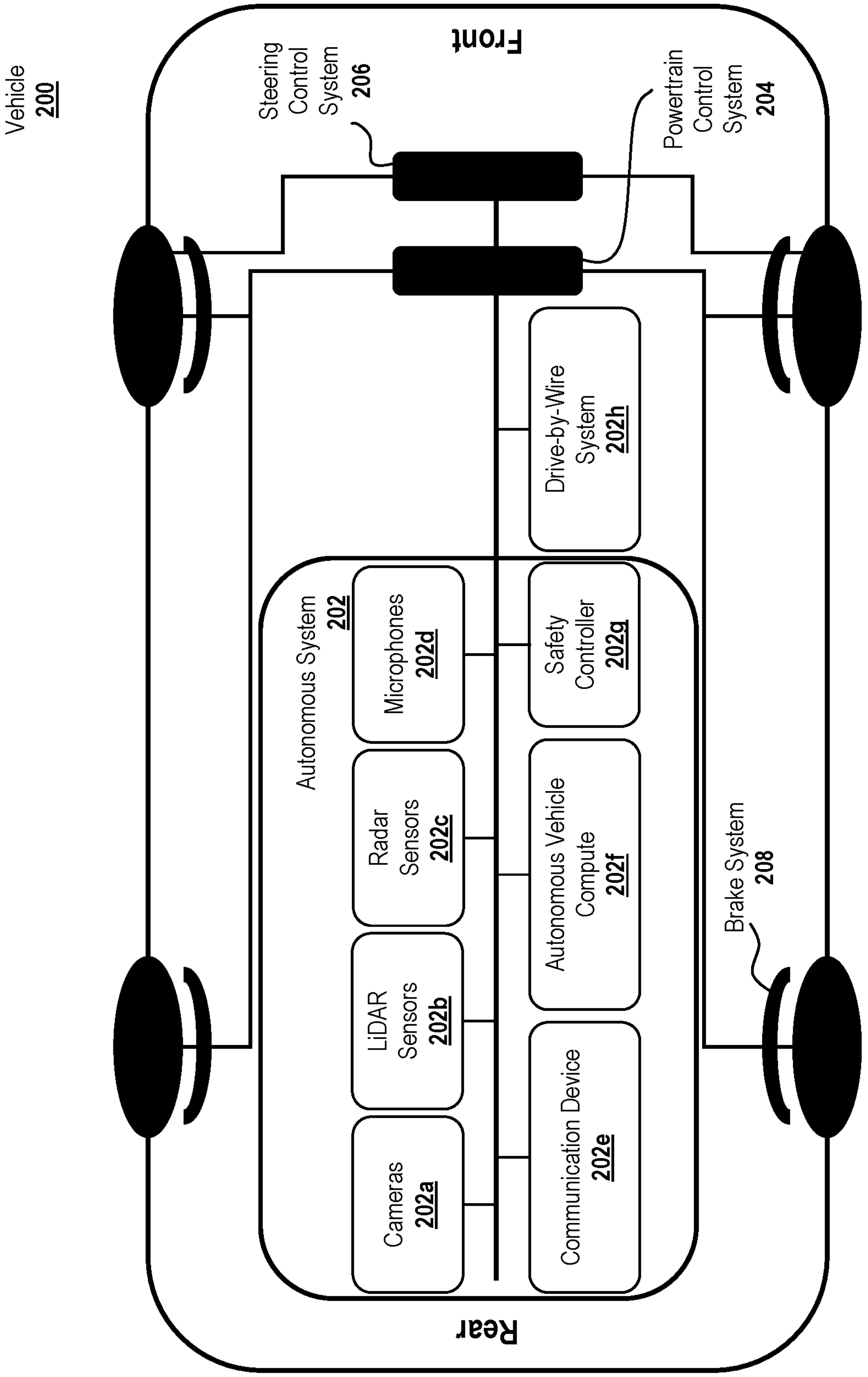
FIG. 2 is a diagram of one or more example systems of a vehicle including an autonomous system.

Referring now to FIG. 2, vehicle 200 (which may be the same as, or similar to vehicle 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202*a*, LiDAR sensors 202*b*, radar sensors 202*c*, and microphones 202*d*. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202*e*, autonomous vehicle compute 202*f*, drive-by-wire (DBW) system 202*h*, and safety controller 202*g*.

Figure 3:
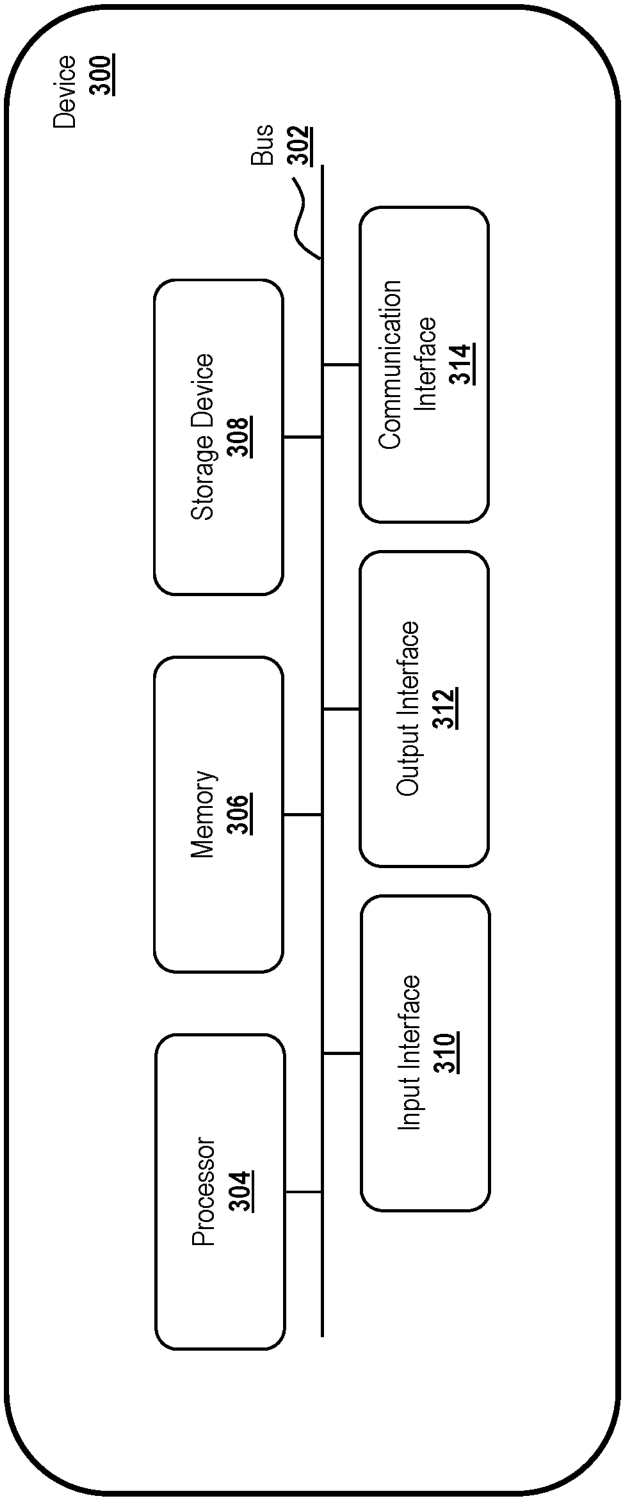
FIG. 3 is a diagram of components of one or more example devices and/or one or more example systems of FIGS. 1 and 2.

Cameras 202*a* include at least one device configured to be in communication with communication device 202*e*, autonomous vehicle compute 202*f*, and/or safety controller 202*g* via a bus (e.g., a bus that is the same as or similar to bus 302 of FIG. 3). Cameras 202*a* include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202*a* generates camera data as output. In some examples, camera 202*a* generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202*a* includes a plurality of independent cameras configured on (e.g., positioned on) a vehicle to capture images for the purpose of stereopsis (stereo vision). In some examples, camera 202*a* includes a plurality of cameras that generate image data and transmit the image data to autonomous vehicle compute 202*f* and/or a fleet management system (e.g., a fleet management system that is the same as or similar to fleet management system 116 of FIG. 1). In such an example, autonomous vehicle compute 202*f* determines depth to one or more objects in a field of view of at least two cameras of the plurality of cameras based on the image data from the at least two cameras. In some embodiments, cameras 202*a* is configured to capture images of objects within a distance from cameras 202*a* (e.g., up to 100 meters, up to a kilometer, and/or the like). Accordingly, cameras 202*a* include features such as sensors and lenses that are optimized for perceiving objects that are at one or more distances from cameras 202*a*.

In an embodiment, camera 202*a* includes at least one camera configured to capture one or more images associated with one or more traffic lights, street signs and/or other physical objects that provide visual navigation information. In some embodiments, camera 202*a* generates traffic light data associated with one or more images. In some examples, camera 202*a* generates TLD (Traffic Light Detection) data associated with one or more images that include a format (e.g., RAW, JPEG, PNG, and/or the like). In some embodiments, camera 202*a* that generates TLD data differs from other systems described herein incorporating cameras in that camera 202*a* can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202*b* include at least one device configured to be in communication with communication device 202*e*, autonomous vehicle compute 202*f*, and/or safety controller 202*g* via a bus (e.g., a bus that is the same as or similar to bus 302 of FIG. 3). LiDAR sensors 202*b* include a system configured to transmit light from a light emitter (e.g., a laser transmitter). Light emitted by LiDAR sensors 202*b* include light (e.g., infrared light and/or the like) that is outside of the visible spectrum. In some embodiments, during operation, light emitted by LiDAR sensors 202*b* encounters a physical object (e.g., a vehicle) and is reflected back to LiDAR sensors 202*b*. In some embodiments, the light emitted by LiDAR sensors 202*b* does not penetrate the physical objects that the light encounters. LiDAR sensors 202*b* also include at least one light detector which detects the light that was emitted from the light emitter after the light encounters a physical object. In some embodiments, at least one data processing system associated with LiDAR sensors 202*b* generates an image (e.g., a point cloud, a combined point cloud, and/or the like) representing the objects included in a field of view of LiDAR sensors 202*b*. In some examples, the at least one data processing system associated with LiDAR sensor 202*b* generates an image that represents the boundaries of a physical object, the surfaces (e.g., the topology of the surfaces) of the physical object, and/or the like. In such an example, the image is used to determine the boundaries of physical objects in the field of view of LiDAR sensors 202*b*.

Radio Detection and Ranging (radar) sensors 202*c* include at least one device configured to be in communication with communication device 202*e*, autonomous vehicle compute 202*f*, and/or safety controller 202*g* via a bus (e.g., a bus that is the same as or similar to bus 302 of FIG. 3). Radar sensors 202*c* include a system configured to transmit radio waves (either pulsed or continuously). The radio waves transmitted by radar sensors 202*c* include radio waves that are within a predetermined spectrum In some embodiments, during operation, radio waves transmitted by radar sensors 202*c* encounter a physical object and are reflected back to radar sensors 202*c*. In some embodiments, the radio waves transmitted by radar sensors 202*c* are not reflected by some objects. In some embodiments, at least one data processing system associated with radar sensors 202*c* generates signals representing the objects included in a field of view of radar sensors 202*c*. For example, the at least one data processing system associated with radar sensor 202*c* generates an image that represents the boundaries of a physical object, the surfaces (e.g., the topology of the surfaces) of the physical object, and/or the like. In some examples, the image is used to determine the boundaries of physical objects in the field of view of radar sensors 202*c*.

Microphones 202*d* includes at least one device configured to be in communication with communication device 202*e*, autonomous vehicle compute 202*f*, and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* includes at least one device configured to be in communication with cameras 202*a*, LiDAR sensors 202*b*, radar sensors 202*c*, microphones 202*d*, autonomous vehicle compute 202*f*, safety controller 202*g*, and/or DBW (Drive-By-Wire) system 202*h*. For example, communication device 202*e* may include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202*f* include at least one device configured to be in communication with cameras 202*a*, LiDAR sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202*f* is the same as or similar to autonomous vehicle compute 400, described herein. Additionally, or alternatively, in some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, LiDAR sensors 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 make longitudinal vehicle motion, such as to start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate. In other words, steering control system 206 causes activities necessary for the regulation of the y-axis component of vehicle motion.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of remote AV system 114, fleet management system 116, V2I system 118, and/or one or more devices of network 112 (e.g., one or more devices of a system of network 112). In some embodiments, one or more devices of vehicles 102 (e.g., one or more devices of a system of vehicles 102 such as at least one device of remote AV system 114, fleet management system 116, and V2I system 118, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
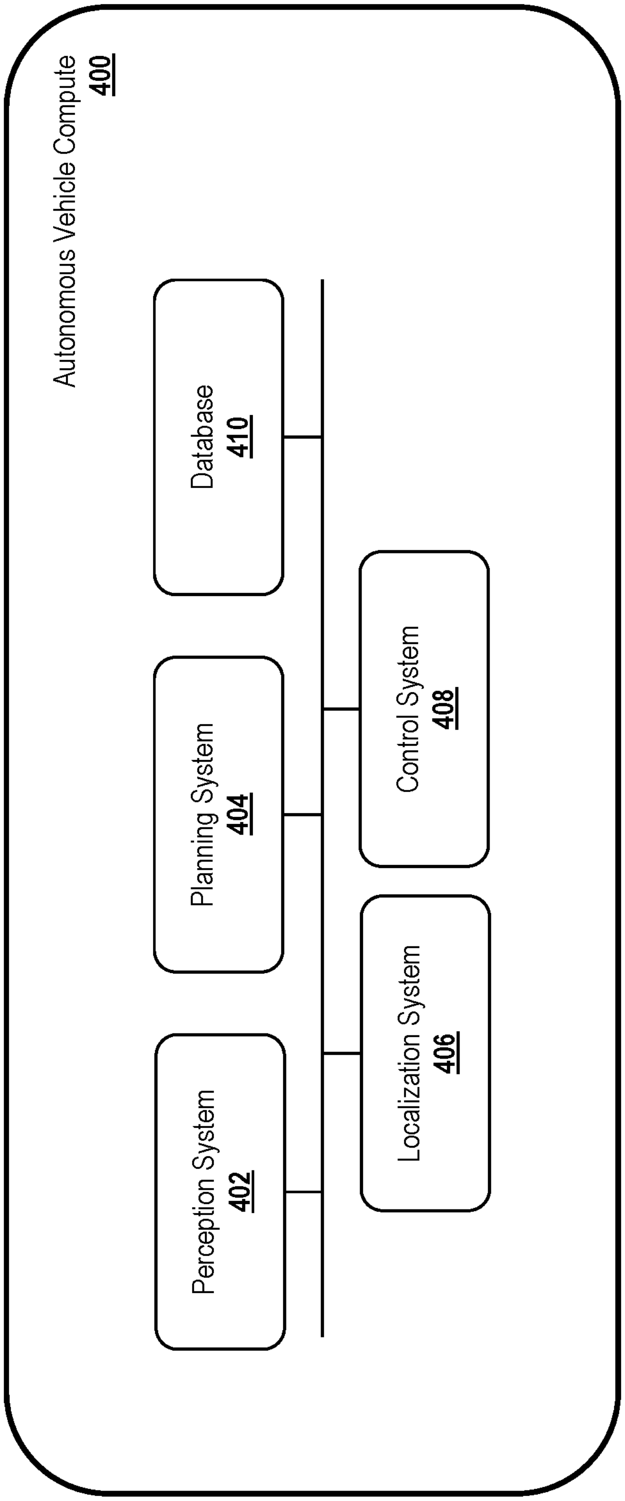
FIG. 4 is a diagram of certain components of an example autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute **202*f* of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118**, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras **202*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402** classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors **202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406** comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system **202*h*, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200** to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5A:
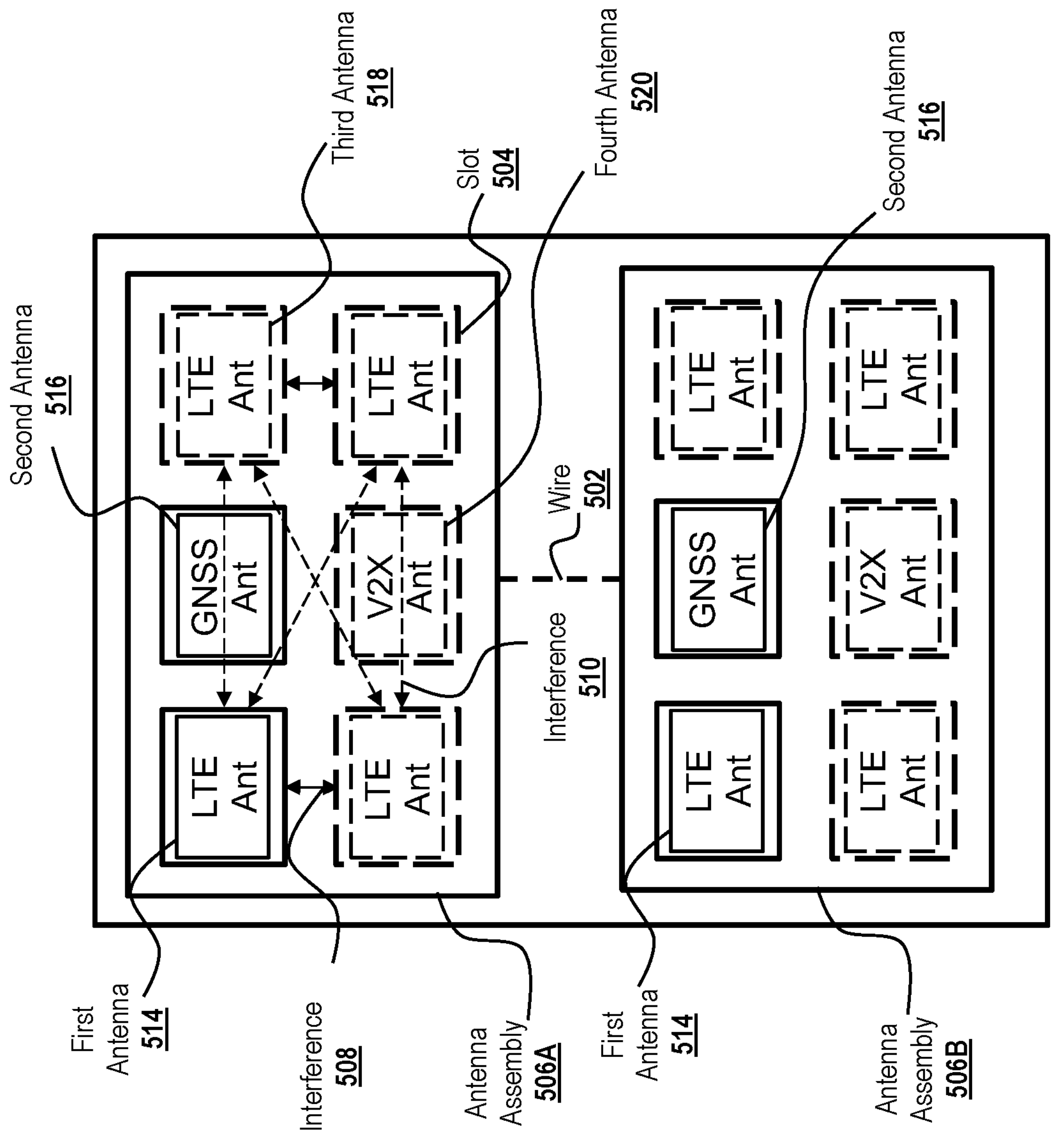
FIGS. 5A-5C are diagrams of an example implementation of an integrated modular antenna system.
Figure 5B:
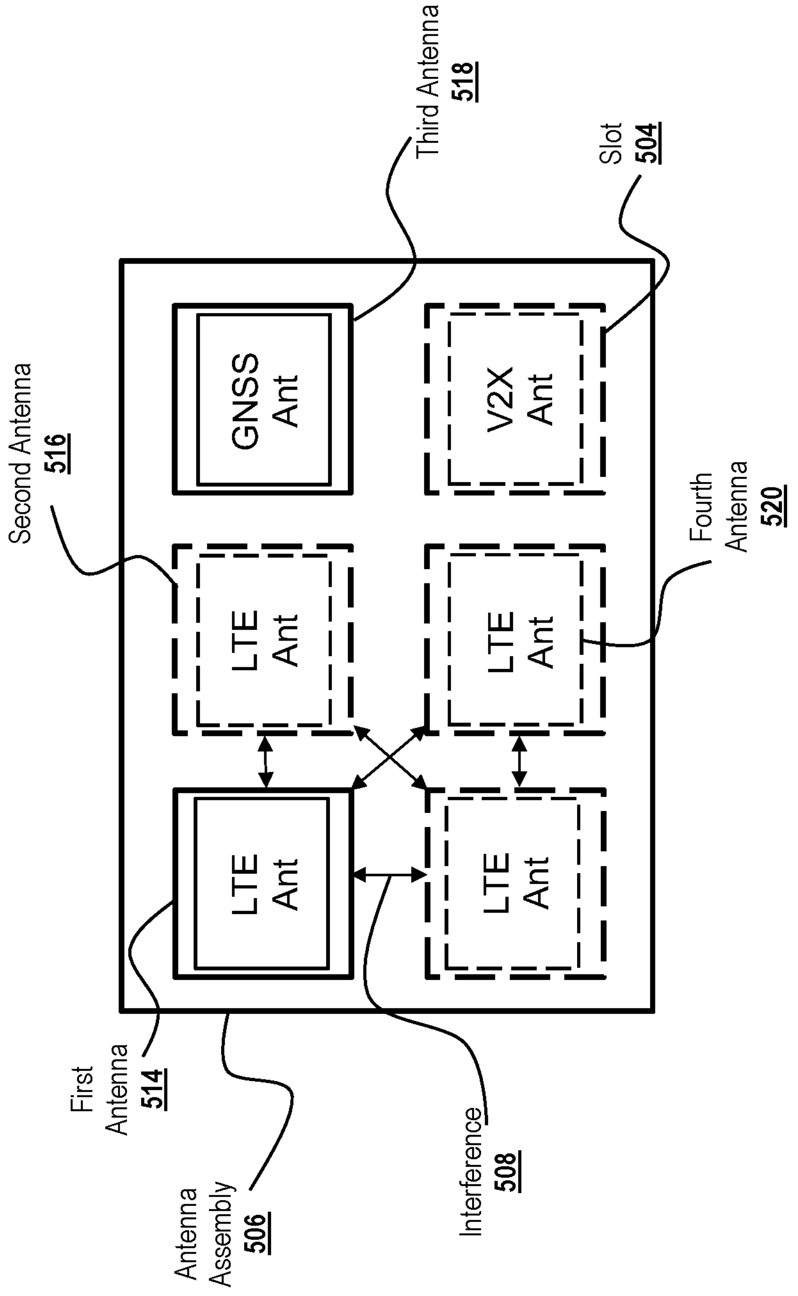
Figure 5C:
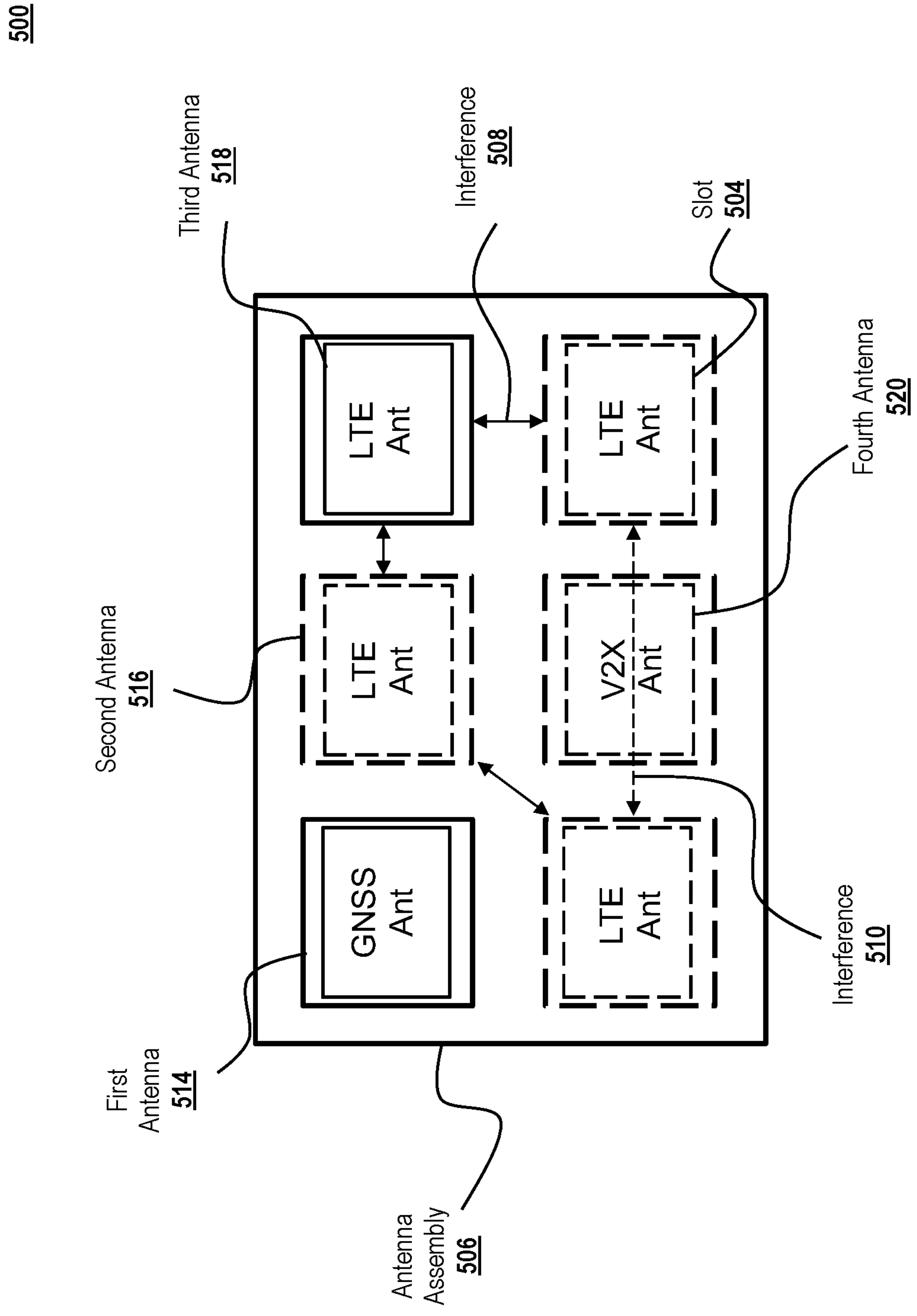

Referring now to FIGS. 5A-C, illustrated are diagrams of a modular antenna system 500. In some embodiments, the modular antenna system 500 is connected with and/or incorporated in a vehicle (e.g., an autonomous vehicle that is the same as, or similar to, vehicle 102 of FIG. 1, vehicle 200 of FIG. 2, vehicle 802 of FIG. 8 and/or vehicle 902 of FIG. 9). In one or more embodiments or examples, modular antenna system 500 is in communication with and/or a part of an AV (e.g., such as Autonomous System 202 illustrated in FIG. 2, device 300 of FIG. 3), an AV system, an AV compute (such as AV compute 202*f* of FIG. 2 and/or AV compute 400 of FIG. 4), a remote AV system (such as remote AV system 114 of FIG. 1), a fleet management system (such as fleet management system 116 of FIG. 1), and a V2I system (such as V2I system 118 of FIG. 1). In one or more examples, the modular antenna system 500 is used for operating a vehicle.

In one or more embodiments or examples, the modular antenna system 500 is in communication with one or more of: a device (such as device 300 of FIG. 3), a localization system (such as localization system 406 of FIG. 4), a communication interface (such as communication interface 315 of FIG. 3), and a control system (such as the control system 408 of FIG. 4).

In one or more embodiments or examples, the modular antenna system 500 includes a plurality of antenna assemblies (e.g., represented by antenna assembly 506A, 506B, collectively referred to as 506), each antenna assembly 506 including at least two antennas (e.g., first antenna 514, second antenna 516, third antenna 518, fourth antenna 520, etc.). In one or more embodiments or examples, the antenna assemblies 506 of the plurality of antenna assemblies are spaced apart. In certain implementations, the antennas are selected from an antenna type of: a cellular communication antenna, a vehicular communication antenna, and a location positioning antenna, where the first antenna 514 is a different antenna type than the second antenna 516.

In other words, the present disclosure relates to integrated modular antenna systems 500 that can be used in autonomous vehicles. For example, antennas for the operation of systems of the vehicle are distributed on the vehicle in antenna assemblies 506 (e.g., distributed or modular antenna systems) and are modifiable for optimization, such as for different vehicle configurations. For example, the antennas for the operation of the systems of the vehicle include different combinations of cellular communication antennas, location positioning antennas, and/or vehicular communication antennas, depending on the target application. The different antennas can be distributed around the vehicle in separate antenna assemblies 506 and may not be limited to a particular location on the vehicle, such as the roof. The placement of the various antenna assemblies 506 for respective communication systems is advantageous for isolation between antennas and for radiation performance.

In one or more examples or embodiments, each antenna is seen as an antenna element and/or a modular antenna. FIG. 5A shows two antenna assemblies 506 including antennas (Ant in FIG. 5A). In certain implementations, antenna assemblies 506 are positioned spaced apart on a vehicle, such as a first antenna assembly 506A being located on a hood and a second antenna assembly 506B being located near the trunk. In certain embodiments, each antenna assembly 506 includes at least two antennas (e.g., first antenna 514, second antenna 516), however, the particular number of antennas is not limiting. In some examples, the modular antenna system 500 includes slots 504 configured to receive (e.g., contain) an antenna. In some examples, as shown in FIG. 5A, the antenna assemblies 506 of the plurality of antenna assemblies are not physically in contact (e.g., they are spaced apart and/or do not share a surface). In some examples, the antenna assemblies 506 of the plurality of antenna assemblies are interconnected (e.g., communicatively coupled) using coaxial and/or ethernet cables (e.g., such as wire 502) and/or wirelessly interconnected.

In some examples, the antennas are configured for cellular communication, vehicular communication and/or location positioning (e.g., antenna types). For example, a cellular communication antenna is a first type of antenna configured for cellular communication, a vehicular communication antenna is a second type of antenna configured for vehicular communication, and a location positioning antenna is a third type of antenna configured for location positioning. In some example, an antenna has an omnidirectional radiation pattern. In one or more embodiments or examples, the first antenna 514 and second antenna 516, and optionally third antenna 518 and/or fourth antenna 520, are different types of antenna and/or the same types of antennas. In one or more embodiments or examples, one or more antennas of a particular antenna assembly 506 are the same type of antenna while at least one antenna of the same antenna assembly 506 is a different type of antenna. Different combinations of antenna types can be used, and the described combinations are not so limited. In some examples, each antenna assembly 506 has different antenna types (e.g., different combinations of antennas). In some examples, each antenna assembly 506 has the same antenna types and optionally the same number of antennas.

In one or more examples or embodiments, the antenna assembly 506 is positionable in a variety of locations on a vehicle. In one or more embodiments or examples, modular antenna system 500 includes a tuning network in order to optimize the performance based on vehicle conditions and/or propagation conditions. For example, the tuning network optimize the impedance of the antenna to get maximum performance at a target frequency band. Vehicle conditions can be seen as dimensions and/or structure of a vehicle. Propagation conditions can be seen as blockage, diffraction, scattering, reflections etc. of transmissions associated with the antennas of the modular antenna system 500. For example, propagation conditions are affected by environmental conditions (e.g., rain, snow, fog) and/or physical obstructions (e.g., a LiDAR sensor housing). In some examples, the modular antenna system 500 includes a compensator configured to overcome the cable loss effect. In some examples, the modular antenna system 500 includes a radio frequency (RF) front end connected to the compensator and/or connected directly to a tuning network. In one or more embodiments or examples, an RF front end, a compensator, a tuning network, and an antenna (e.g., a cellular communication antenna, a location positioning antenna and/or a vehicular communication antenna) are communicatively coupled.

As mentioned, in certain implementations, the modular antenna system 500 may include one or more location positioning antennas. For example, the location positioning antenna is one or more of global navigation satellite system (GNSS) antennas, global positioning system (GPS) antennas, a BeiDou antennas, a Globalnaya Navigazionnaya Sputnikovaya Sistema (GLONASS) antennas, Galileo antennas, and the like. In one or more embodiments or examples, the first antenna 514 and/or the second antenna 516 is a location positioning antenna. In one or more embodiments or examples, the location positioning antenna is configured to communicate using a satellite positioning system. In one or more embodiments or examples, the location positioning antenna is configured to obtain location data indicative of a location of a vehicle (such as via localization system 406 of FIG. 4). For example, when the modular antenna system 500 is attached to an autonomous vehicle, the location positioning antenna is configured to determine a location of the autonomous vehicle (such as vehicle 102 of FIG. 1, vehicle 200 of FIG. 2, vehicle 802 of FIG. 8 and/or vehicle 902 of FIG. 9).

Figure 8:
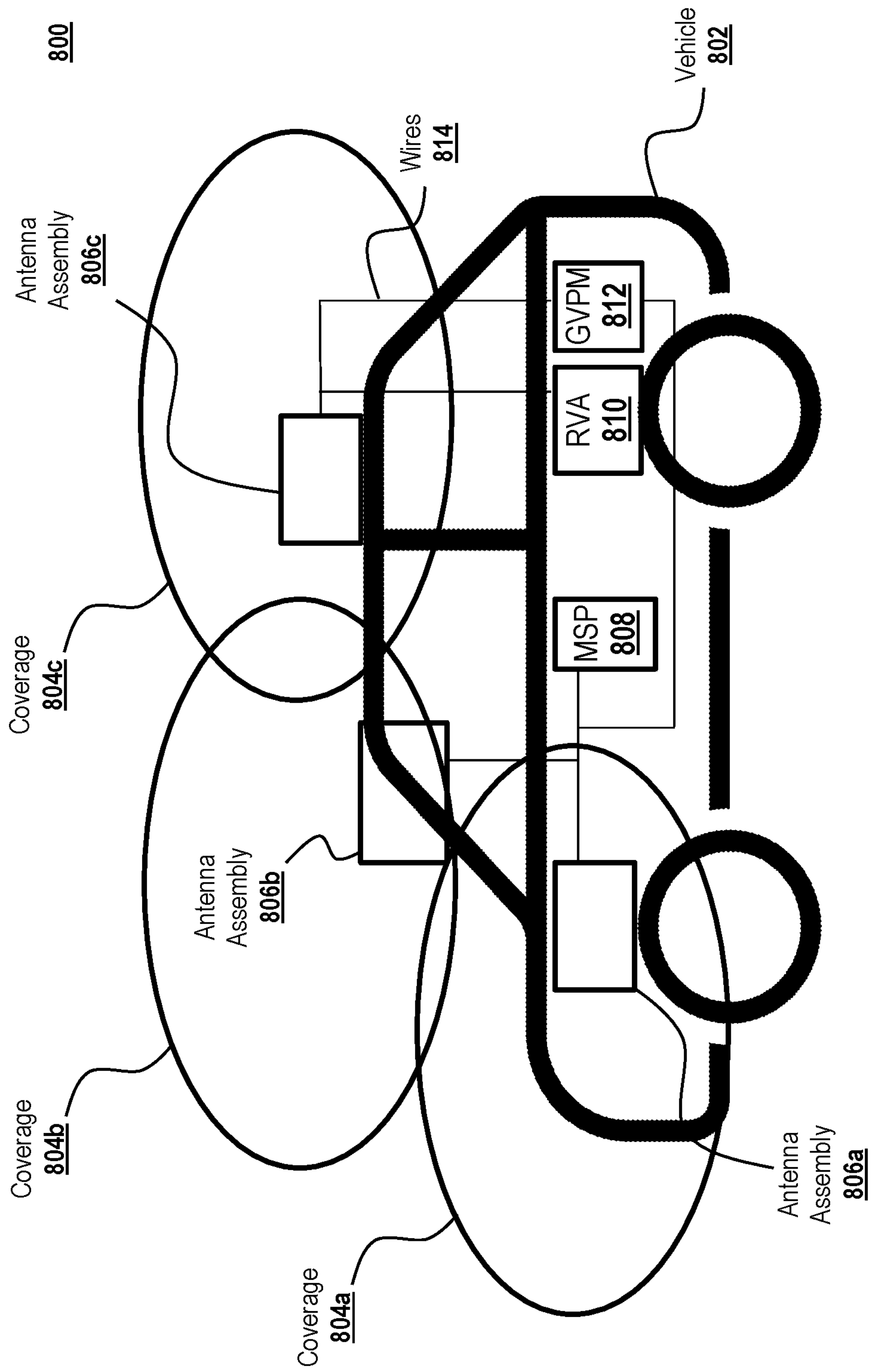
FIG. 8 is a diagram of an example implementation of an integrated modular antenna system for a vehicle.

In one or more embodiments or examples, the modular antenna system 500 includes a vehicular communication antenna. For example, the one or more vehicular communication antennas includes one or more of: vehicle-to-everything (V2X) antennas, vehicle-to-vehicle (V2V) antennas, vehicle-to-infrastructure (V2I) antennas and vehicle-to-pedestrian (V2P) antennas. In one or more embodiments or examples, first antenna 514 and/or the second antenna 516 is a vehicular communication antenna. In one or more embodiments or examples, the vehicular communication antenna is a part of, or forms part of, a vehicular communication system (e.g., communicating using the communication device 202*e* of FIG. 2). The vehicular communication antenna can be configured to communicate, such as transmit data, and/or receive data, to and from other connectable devices and/or equipment within a particular area (such as an area included in the coverage 804*a*, 804*b*, and/or 804*c* of the antenna assemblies 806*a*, 806*b* and/or 806*c* as shown in FIG. 8).

In one or more embodiments or examples, the modular antenna system 500 includes a cellular communication antenna configured to transmit, receive, and/or obtain data. For example, the cellular communication antenna is configured to communicate with one or more of a network node, a base station, and a network. In one or more embodiments or examples, the first antenna 514 is a cellular communication antenna. In one or more embodiments or examples, the second antenna 516 is a cellular communication antenna. In one or more embodiments or examples, the cellular communication antenna is one or more of a long-term evolution (LTE) antenna, a 4G antenna, a 5G antenna, a millimeter-wave antenna, a new radio (NR) antenna and 6G antenna. The cellular communication antenna can be upgraded, and the particular type of antenna is not limiting. The cellular communication antenna can be configured to function, such as transmit, receive, and/or obtain data, with one or more networks, such as a cellular network. The particular network is not limiting. In one or more embodiments or examples, where a plurality of cellular communication antennas are used, each antenna is configured to cover a portion of the frequency spectrum, the same frequency spectrum and/or some overlapping portions of the frequency spectrum.

As shown in the example of FIG. 5A, each antenna assembly 506 optionally includes additional antennas, such as third antenna 518 and/or fourth antenna 520, both of which are selected from the antenna type of: a cellular communication antenna, a vehicular communication antenna, and a location positioning antenna. In one or more embodiments or examples, the third antenna 518 is of the same antenna type as the first antenna 514 and/or the second antenna 516.

In one or more embodiments or examples, the second antenna 516 is positioned between (e.g., located between) the first antenna 514 and the third antenna 518. This configuration is shown in FIG. 5A. This particular positioning can improve isolation performance and/or to improve the radiation coverage (such as coverage 804*a*, 804*b*, and/or 804*c* shown in FIG. 8). Interference occurs when a cellular communication antenna is in close proximity with another cellular communication antenna (e.g., when collocated in the same housing). Examples of interference are interference 508 and interference 510 which is weaker than interference 508. In some examples, the greater the distance from a cellular communication antenna to another cellular communication antenna, the lower the interference will be. In one or more embodiments or examples, the weak interference 510 is, at least partially, due to a greater separation between the cellular communication antennas. For example, in the example shown in FIG. 5A, the LTE antenna pairs (e.g., cellular communication antennas) are located on opposite sides of the antenna assembly 506A to ensure sufficient distance between them, and thereby isolation between them. In some examples, the location positioning antennas (e.g., GNSS antennas in FIG. 5A), vehicular communication antenna (e.g., V2X antennas in FIG. 5A) and/or cellular communication antennas use different frequency bands. It can be advantageous for the antenna assemblies 506 to be configured such that the vehicular communication antenna and/or the location positioning antenna are located at the center of the antenna assembly 506 (such as between a pair of cellular communication antennas), such as shown in FIG. 5A. In other words, the antenna assembly 506 can be configured such that the vehicular communication antenna and/or the location positioning antenna are located between two pairs of cellular communication antennas to increase the distance between the cellular communication antennas (e.g., to minimize interference).

FIGS. 5B-C show alternative configurations of an antenna assembly 506 of a modular antenna system 500. In the examples of FIG. 5B and FIG. 5C, the separation between the cellular communication antennas is smaller than for the example of FIG. 5A, and therefore stronger interference 508 is present. In the examples of FIG. 5B and FIG. 5C, the distance between the LTE antennas is too small resulting in poor isolation and poor radiation. The antenna assembly 506 of FIC. 5C, includes less strong interference 508 than the antenna assembly 506 of FIG. 5B due to the greater separation of the cellular communication antennas. In the example of FIG. 5B, both the location positioning antenna and the vehicular communication antenna are located at the same side of the antenna assembly 506.

In one or more embodiments or examples, the modular antenna system 500 includes two antenna assemblies 506, three antenna assemblies 506, four antenna assemblies 506, or five antenna assemblies 506. In the examples of FIG. 5A-C, the antenna assembly 506 can be the same as antenna assemblies 806*a*, 806*b* and/or 806*c* of FIG. 8. In some examples, the antenna assemblies 506 are all the same (such as the antenna assemblies 506 include the same configuration of antennas). In some examples, the antenna assemblies 506 are different (e.g., having a different configuration and/or number of antennas). In some examples, some of the antenna assemblies 506 are the same while some antenna assemblies 506 are different. The particular number of antenna assemblies is not limiting. In one or more embodiments or examples, at least one antenna assembly 506 includes: four cellular communication antennas, one vehicular communication antenna, and one location positioning antenna. In one or more embodiments or examples, the one vehicular communication antenna is positioned between a first pair of cellular communication antennas of the four cellular communication antennas and the one location positioning antenna is located between a second pair of cellular communication antennas of the four cellular communication antennas, the first pair being different from the second pair. In other words, the modular antenna system 500 can be configured such that the location positioning antenna and the vehicular communication antenna of antenna assembly 506 are situated between two pairs (such as one pair each) of cellular communication antennas. In certain examples, the one vehicular communication antenna is an adjacent antenna (e.g., an antenna next to) to the one location positioning antenna.

In one or more embodiments or examples, each antenna assembly 506 of the plurality of antenna assemblies includes slots 504, each slot 504 configured to receive and/or retain an antenna. In some examples, each antenna is located (such as mounted and/or fitted) in a slot 504. For example, in an antenna assembly 506 there is one slot 504 for each antenna (e.g., first antenna 514, second antenna 516), though every slot 504 does not need to be filled by an antenna. In some examples, the slots 504 have a shape complimentary to the shape of the antenna. In some examples, the slot 504 includes holes to make way for cables to connect to the antenna. The particular size and dimensions of the slot 504 is not limiting. For example, the shape of slot 504 is rectangular, triangular, circular, and/or polygonal.

In one or more embodiments or examples, each antenna assembly 506 includes a tuning network configured to tune one or more of the antennas based on propagation conditions. For example, the tuning network is operatively coupled to the first antenna 514, second antenna 516, etc. In some examples, modular antenna system 500 includes a tuning network associated with each antenna. In other words, the modular antenna system 500 can include one tuning network per antenna and/or per antenna assembly 506. In some examples, the modular antenna system 500 is configured to utilize radio tuning (e.g., updating the configuration of radio waves to the propagation conditions). In some examples, the modular antenna system 500 is configured to tune the antennas such that the gain and/or radiation pattern of information transmitted by the antennas is changed (such as improved and/or optimized).

In one or more embodiments or examples, each antenna assembly 506 is configured to be positioned at different locations on a vehicle. For example, the antenna assemblies 506 are spaced apart at different areas of the vehicle (e.g., external, internal, hood, trunk, roof, etc.). The positioning and/or location of the plurality of antenna assemblies is not limiting.

Figure 6:
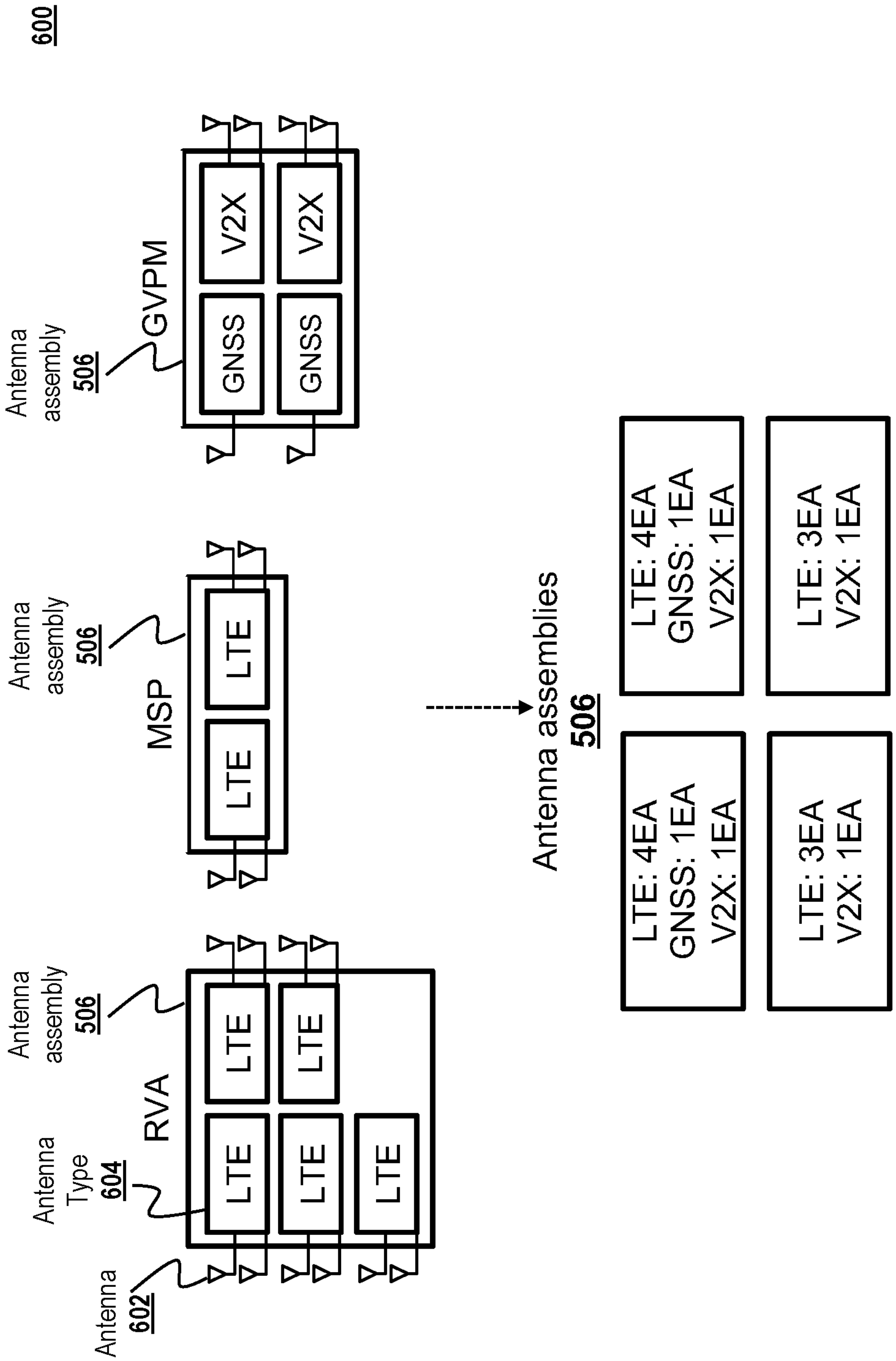
FIG. 6 is a diagram depicting example antenna assemblies for an integrated modular antenna system.

Referring now to FIG. 6, a diagram 600 depicting example antenna assemblies is shown. In FIG. 6, each antenna 602 is denoted by a triangle associated with an antenna type 604. In the example of FIG. 6, the antennas associated the remote vehicle assistance (RVA) system, the mission service platform (MSP) system and the global vehicle positioning module (GVPM) system are antennas used for operation of the respective system. For example, the RVA system uses ten cellular communication antennas, the MSP system uses four cellular communication antennas, and the GVPM system uses two location positioning antennas and four vehicular communication antennas. These respective antennas can then be distributed into antenna assemblies 506 as shown in FIG. 6. In FIG. 6A, EA can be seen as antenna elements. For example, "LTE: 4EA" can be alternatively written as 4 LTE antennas.

Figure 7:
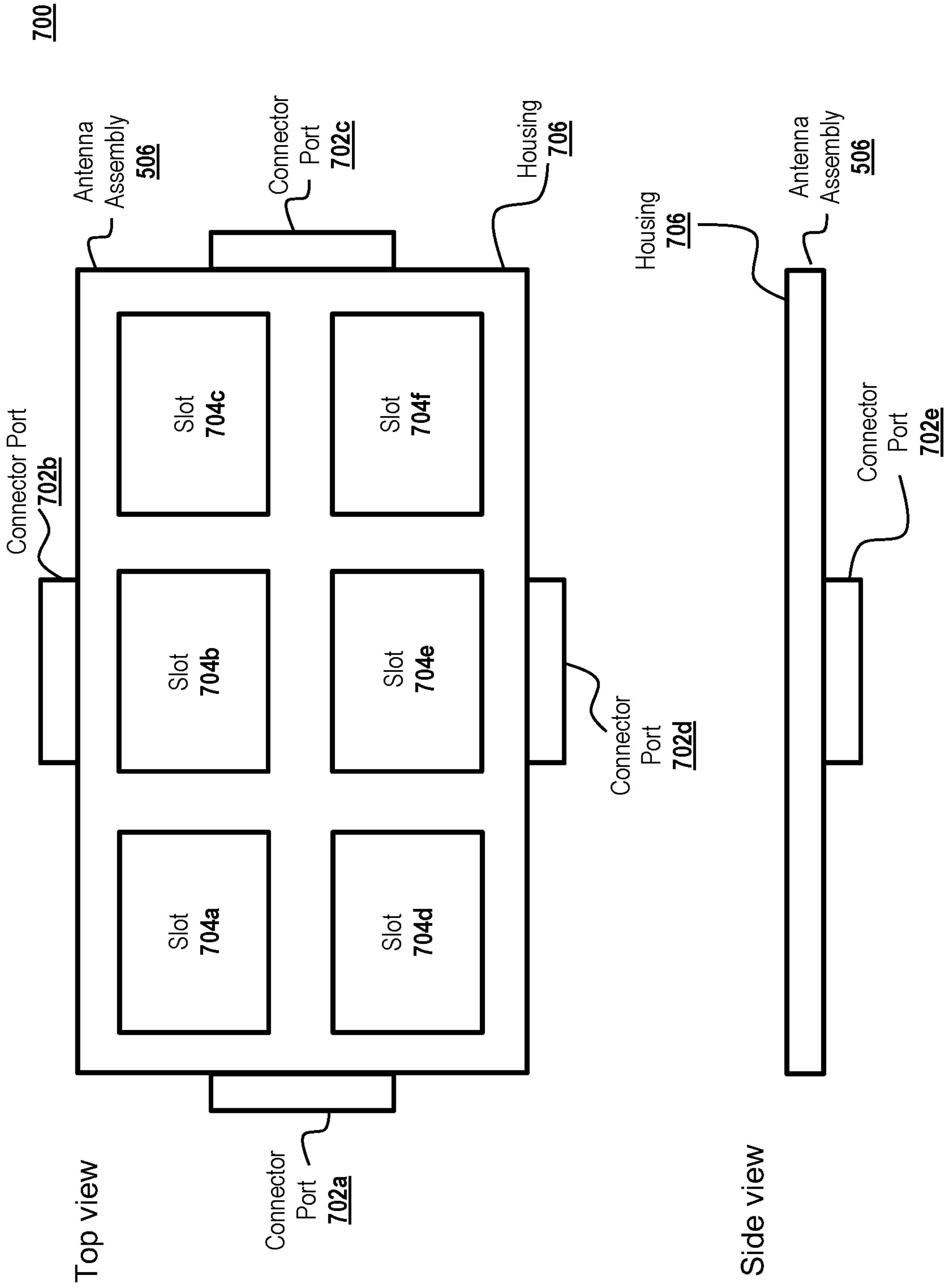
FIG. 7 are diagrams of an example housing for an integrated modular antenna system.

Referring now to FIG. 7, diagrams 700 of an example housing 706 for an example antenna assembly 506 are shown. The housing 706 can be configured to contain an antenna assembly 506 (e.g., delineate the bounds of an antenna assembly 506), though a housing 706 is not always used. In some examples, the modular antenna system 500 is configured such that the housing 706 contains, retains, holds, surrounds, and/or encompasses, one or more antennas. The modular antenna system 500 can be configured such that the housing 706 includes other components as well, such as wiring, circuitry, power supplies, modems, etc. In some embodiments or examples, the housing 706 is attached to a vehicle and/or integrally formed with the vehicle. The housing 706 can be detached and reattached (such as in a different location) to a vehicle. The particular size and dimensions of the housing 706 is not limiting. For example, the housing 706 has a rectangular cross section, a triangular cross section, a circular cross section, and/or a polygonal cross section. In one or more embodiments or examples, the housing 706 is configured to allow signals, such as radiofrequency signals, to pass through the housing 706. In one or more embodiments or examples, the housing 706 includes electrical ports. In some examples, the housing 706 includes holes and/or openings for cables to enter and/or exit the housing 706. The housing 706 can be sized to fit anywhere on and/or inside a vehicle, such as an autonomous vehicle. The particular material of the housing 706 is not limiting. For example, the housing 706 is made from one or more of plastic, polymer, metal, glass, and ceramic.

In the example of FIG. 7, the housing 706 includes six slots 704*a*, 704*b*, 704*c*, 704*d*, 704*e*, 704*f* referred to collectively as slots 704. In the example of FIG. 7, the antenna housing 706 includes five connector ports 702*a*, 702*b*, 702*c*, 702*d*, 702*e* referred to collectively as connector ports 702. In some examples, the slots 704 are the same as slot 504 of FIG. 5A-C. The housing 706 can be configured to include any number of slots 704 and any number of connector ports 702. In some examples, the connector ports 702 are configured for coaxial and/or ethernet cables. In some examples, the configuration of the housing 706, the slots 704 and/or the connector ports 702 is flexibly employed (such as flexibly implemented) according to the antenna structure.

Referring now to FIG. 8, a diagram of an example implementation of an integrated modular antenna system (e.g., modular antenna system 500) for a vehicle is shown. FIG. 8 shows examples of positioning of the antenna assemblies at different locations of a vehicle. The vehicle 802 can be the same as vehicle 102 of FIG. 1, vehicle 200 of FIG. 2 and/or vehicle 902 of FIG. 9. In the example of FIG. 8, the vehicle 802 includes three antenna assemblies 806*a*, 806*b*, 806*c* referred to collectively as antenna assemblies 806 (e.g., including some and/or all of the components of antenna assembly 506). In some examples, the antenna assemblies provide coverage 804*a*, 804*b*, 804*c* referred to collectively as coverage 804. Coverage 804 can be seen as the space (such as a 3D space) based on communication range and/or radiation of the antennas of the plurality of antenna assemblies (for example, for the particular antenna type). In some examples, the coverage 804 permits communication between an antenna of the antenna assembly 806 associated with the vehicle 802 and a base station (or other infrastructure). In some examples, the vehicle 802 includes a MSP system 808, an RSA system 810 and/or a GVPM system 812, and are connected by wires 814 to the respective antenna assemblies 806, though wireless communication can be used as well. In some examples, the MSP system 808 is configured to provide and/or receive information indicative of the mission and/or the ride to and/or from respectively a user device. In other words, the MSP system 808 can be configured to provide information indicative of the status of the ride to a user device associated with the vehicle 802 (e.g., to a passenger riding in the vehicle 802) during the ride (e.g., provide a message to the user device including the text, "15 minutes remaining until arrival at destination"). In some examples, the RVA system 810 is configured such that a user associated with the vehicle 802 (such as a passenger) can communicate with individuals associated with the ride (such as communicate with an assistance service).

Figure 9:
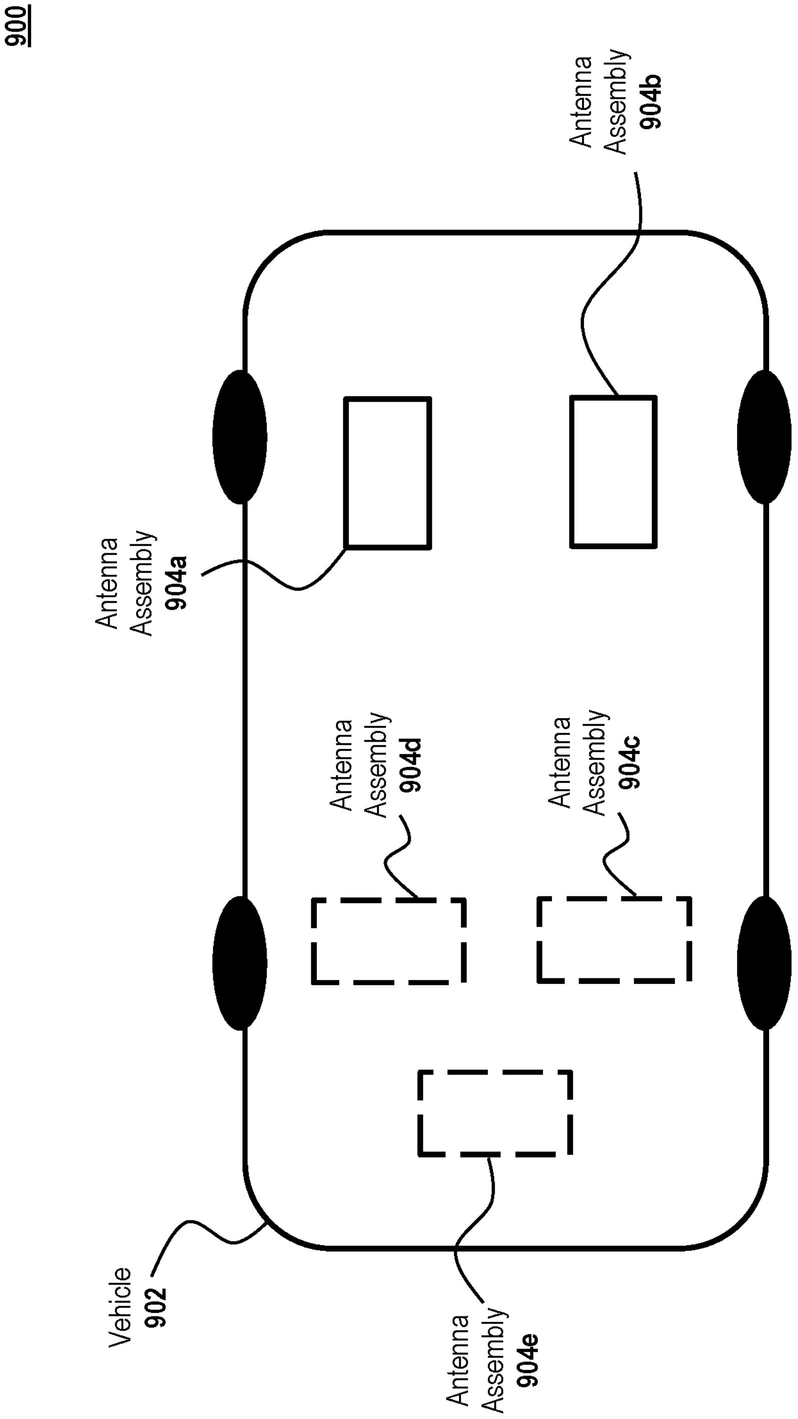
FIG. 9 is a diagram of an example implementation of an integrated modular antenna system for a vehicle.

Referring now to FIG. 9, a diagram 900 of an example implementation of an integrated modular antenna system (e.g., modular antenna system 500) for a vehicle is shown. The vehicle 902 can be the same as vehicle 102 of FIG. 1, vehicle 200 of FIG. 2 and/or vehicle 802 of FIG. 8. In the example of FIG. 9, the vehicle 902 includes antenna assemblies 904*a*, 904*b*, 904*c*, 904*d*, 904*e* referred to collectively as antenna assemblies 904 (e.g., including some and/or all of the components of antenna assembly 506). In one or more embodiments or examples, the vehicle 902 includes two antenna assemblies (e.g., antenna assembly 904*a*, 904*b*), three antenna assemblies (adding 904*c*), four antenna assemblies (adding 904*d*), or five antenna assemblies (adding 904*e*). The positioning of the antenna assemblies 904 shown in FIG. 9 is merely illustrative, and other locations can be used as well. As an example, a five antenna assembly system includes twenty cellular communication antennas, four vehicle communication antenna, and four location positioning antennas, a four antenna assembly system includes sixteen cellular communication antennas, four vehicle communication antenna, and four location positioning antennas, a three antenna assembly system includes twelve cellular communication antennas, two vehicle communication antenna, and two location positioning antennas, and a two antenna assembly system includes eight cellular communication antennas, two vehicle communication antenna, and two location positioning antennas.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Also disclosed are modular antenna systems and vehicles according to any of the following items:

Item 1. A modular antenna system comprising:

a plurality of antenna assemblies, wherein each antenna assembly of the plurality of antenna assemblies comprises a first antenna and a second antenna, wherein the antenna assemblies of the plurality of antenna assemblies are spaced apart;

wherein the first antenna and the second antenna are selected from an antenna type of: a cellular communication antenna, a vehicular communication antenna, and a location positioning antenna; and wherein the first antenna is a different antenna type than the second antenna.

Item 2. The modular antenna system of item 1, wherein each antenna assembly of the plurality of antenna assemblies comprises a third antenna selected from the antenna type of: a cellular communication antenna, a vehicular communication antenna, and a location positioning.

Item 3. The modular antenna system of item 2, wherein the third antenna is of the same antenna type as the first antenna.

Item 4. The modular antenna system of any of items 2-3, wherein the second antenna is positioned between the first antenna and the third antenna.

Item 5. The modular antenna system of any of the preceding items, wherein each antenna assembly of the plurality of antenna assemblies comprises a fourth antenna selected from the antenna type of: a cellular communication antenna, a vehicular communication antenna, and a location positioning antenna.

Item 6. The modular antenna system of any of the preceding items, wherein the plurality of antenna assemblies comprises one of: two antenna assemblies, three antenna assemblies, four antenna assemblies, and five antenna assemblies.

Item 7. The modular antenna system of any of the preceding items, wherein at least one of the plurality of antenna assemblies comprises:

four cellular communication antennas;

one vehicular communication antenna; and one location positioning antenna.

Item 8. The modular antenna system of item 7, wherein the one vehicular communication antenna is positioned between a first pair of cellular communication antennas of the four cellular communication antennas, and wherein the one location positioning antenna is located between a second pair of cellular communication antennas of the four cellular communication antennas, the first pair being different from the second pair.

Item 9. The modular antenna system of any of items 7-8, wherein the one vehicular communication antenna is an adjacent antenna to the one location positioning antenna.

Item 10. The modular antenna system of any of the preceding items, wherein each antenna assembly of the plurality of antenna assemblies comprises slots, each slot configured to receive and/or retain an antenna.

Item 11. The modular antenna system of any of the preceding items, wherein each antenna assembly of the plurality of antenna assemblies comprises a tuning network configured to tune the first antenna based on propagation conditions, wherein the tuning network is operatively coupled to the first antenna.

Item 12. The modular antenna system of any of the preceding items, wherein each antenna assembly of the plurality of antenna assemblies is configured to be positioned at different locations of a vehicle.

Item 13. A vehicle comprising:

a modular antenna system comprising:

a plurality of antenna assemblies, wherein each antenna assembly of the plurality of antenna assemblies comprises a first antenna and a second antenna, wherein the antenna assemblies of the plurality of antenna assemblies are spaced apart;

wherein the first antenna and the second antenna are selected from an antenna type of: a cellular communication antenna, a vehicular communication antenna, and a location positioning antenna; and wherein the first antenna is a different antenna type than the second antenna.

Item 14. The vehicle of item 13, wherein each antenna assembly of the plurality of antenna assemblies comprises a third antenna selected from the antenna type of: a cellular communication antenna, a vehicular communication antenna, and a location positioning antenna.

Item 15. The vehicle of item 14, wherein the third antenna is of the same antenna type as the first antenna.

Item 16. The vehicle of any one of items 14-15, wherein the second antenna is positioned between the first antenna and the third antenna.

Item 17. The vehicle of any one of items 13-16, wherein each antenna assembly of the plurality of antenna assemblies comprises a fourth antenna selected from the antenna type of: a cellular communication antenna, a vehicular communication antenna, and a location positioning antenna.

Item 18. The vehicle of any one of items 13-17, wherein the plurality of antenna assemblies comprises one of: two antenna assemblies, three antenna assemblies, four antenna assemblies, and five antenna assemblies.

Item 19. The vehicle of any one of items 13-18, wherein at least one of the plurality of antenna assemblies comprises:

four cellular communication antennas;

one vehicular communication antenna; and one location positioning antenna.

Item 20. The vehicle of item 19, wherein the one vehicular communication antenna is positioned between a first pair of cellular communication antennas of the four cellular communication antennas, and wherein the one location positioning antenna is located between a second pair of cellular communication antennas of the four cellular communication antennas, the first pair being different from the second pair.

Item 21. The vehicle of items 19-20, wherein the one vehicular communication antenna is an adjacent antenna to the one location positioning antenna.

Item 22. The vehicle of any one of items 13-21, wherein each antenna assembly of the plurality of antenna assemblies comprises slots, each slot configured to receive and/or retain an antenna.

Item 23. The vehicle of any one of items 13-22, wherein each antenna assembly of the plurality of antenna assemblies comprises a tuning network configured to tune the first antenna based on propagation conditions, wherein the tuning network is operatively coupled to the first antenna.

Item 24. The vehicle of any one of items 13-23, wherein each antenna assembly of the plurality of antenna assemblies is configured to be positioned at different locations of a vehicle.

Item 25. The vehicle of any one of items 13-24, wherein the vehicle is an autonomous vehicle.

Item 26. A modular antenna system comprising:

a plurality of antenna assemblies, wherein each antenna assembly of the plurality of antenna assemblies comprises a first antenna, a second antenna, and a third antenna, wherein the antenna assemblies of the plurality of antenna assemblies are spaced apart;

wherein the first antenna is a different antenna type than the second antenna; and wherein the third antenna is of the same antenna type as the first antenna.

What is claimed is:

1. A modular antenna system comprising:

a plurality of antenna assemblies, wherein a first antenna assembly of the plurality of antenna assemblies is located on an exterior surface of a roof of a vehicle and a second antenna assembly of the plurality of antenna assemblies is located at a location other than the exterior surface of the roof of the vehicle, wherein each antenna assembly of the plurality of antenna assemblies comprises;

a housing configured to removably attach to a surface of the vehicle, a plurality of uniformly shaped slots located within the housing, wherein each slot of the plurality of uniformly shaped slots is configured to retain an antenna, a first cellular communication antenna removably attached to a first slot of the plurality of uniformly shaped slots, a second cellular communication antenna removably attached to a second slot of the plurality of uniformly shaped slots, and a first vehicular communication antenna removably attached to a third slot of the plurality of uniformly shaped slots, wherein the third slot is located between the first slot and the second slot such that the first vehicular communication antenna is located between the first cellular communication antenna and the second cellular communication antenna.

2. The modular antenna system of claim 1, wherein the first antenna assembly of the plurality of antenna assemblies comprises a first location positioning antenna removably attached to a fourth slot of the plurality of uniformly shaped slots.

3. The modular antenna system of claim 1, wherein the plurality of antenna assemblies comprises at least four antenna assemblies.

4. The modular antenna system of claim 1, wherein the first antenna assembly further comprises:

a third cellular communication antennas removably attached to a fourth slot of the plurality of uniformly shaped slots;

a fourth cellular communication antenna removably attached to a fifth slot of the plurality of uniformly shaped slots; and a first location positioning antenna removably attached to a sixth slot of the plurality of uniformly shaped slots.

5. The modular antenna system of claim 4, wherein the sixth slot is located between the fourth slot and the fifth slot such that the first location positioning antenna is located between the third cellular communication antenna and the fourth cellular communication antenna.

6. The modular antenna system of claim 4, wherein the third slot is adjacent the sixth slot such that the first vehicular communication antenna adjacent to the first location positioning antenna.

7. The modular antenna system of claim 1, wherein each antenna assembly of the plurality of antenna assemblies further comprises a tuning network configured to tune the first cellular communication antenna based on propagation conditions, wherein the tuning network is operatively coupled to the first cellular communication antenna.

8. The modular antenna system of claim 1, wherein the first cellular communication antenna is communicatively coupled to a remote vehicle assistance module, the second cellular communication antenna is communicatively coupled to a mission service module, and the first vehicular communication antenna is communicatively coupled to a global vehicle positioning module, wherein the remote vehicle assistance module is configured to enable a rider of the vehicle to communicate with a remotely located vehicle assistance system, wherein the mission service module is configured to communicate with a user device regarding a ride of the rider, wherein the global vehicle positioning module is configured to determine a physical location of the vehicle.

9. The modular antenna system of claim 1, wherein the housing is a first housing and the plurality of uniformly shaped slots is a first plurality of uniformly shaped slots, the modular antenna system further comprising a third antenna assembly separate from the plurality of antenna assemblies, wherein the third antenna assembly comprises:

a second housing configured to removably attach to a surface of the vehicle, a second plurality of uniformly shaped slots located within the second housing, wherein each slot of the second plurality of uniformly shaped slots is configured to retain an antenna, a second vehicular communication antenna removably attached to a first slot of the second plurality of uniformly shaped slots, and a first location positioning antenna removably attached to a second slot of the second plurality of uniformly shaped slots.

10. A vehicle comprising:

a modular antenna system comprising:

a plurality of antenna assemblies, wherein a first antenna assembly of the plurality of antenna assemblies is located on an exterior surface of a roof of a vehicle and a second antenna assembly of the plurality of antenna assemblies is located at a location other than the exterior surface of the roof of the vehicle, wherein each antenna assembly of the plurality of antenna assemblies comprises:

a housing configured to removably attach to a surface of the vehicle, a plurality of uniformly shaped slots located within the housing, wherein each slot of the plurality of uniformly shaped slots is configured to retain an antenna, a first cellular communication antenna removably attached to a first slot of the plurality of uniformly shaped slots, a second cellular communication antenna removably attached to a second slot of the plurality of uniformly shaped slots, and a first vehicular communication antenna removably attached to a third slot of the plurality of uniformly shaped slots, wherein the third slot is located between the first slot and the second slot such that the first vehicular communication antenna is located between the first cellular communication antenna and the second cellular communication antenna.

11. The vehicle of claim 10, wherein the first antenna assembly of the plurality of antenna assemblies comprises a first location positioning antenna removably attached to a fourth slot of the plurality of uniformly shaped slots.

12. The vehicle of claim 10, wherein the plurality of antenna assemblies comprises at least four antenna assemblies.

13. The vehicle of claim 10, wherein the first antenna assembly further comprises:

a third cellular communication antennas removably attached to a fourth slot of the plurality of uniformly shaped slots;

a fourth cellular communication antenna removably attached to a fifth slot of the plurality of uniformly shaped slots; and a first location positioning antenna removably attached to a sixth slot of the plurality of uniformly shaped slots.

14. The vehicle of claim 10, wherein the vehicle is an autonomous vehicle.

* * * * *